United States Patent
Fredriksson et al.

(10) Patent No.: US 10,569,683 B2
(45) Date of Patent: Feb. 25, 2020

(54) HEADREST SUPPORT ASSEMBLY

(71) Applicant: Ford Global Technologies, LLC, Dearborn, MI (US)

(72) Inventors: Chris Fredriksson, LaSalle (CA); Michael Steven Medoro, Livonia, MI (US); Derren Woods, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/012,034

(22) Filed: Jun. 19, 2018

(65) Prior Publication Data
US 2019/0381919 A1   Dec. 19, 2019

(51) Int. Cl.
| B60N 2/80 | (2018.01) |
|---|---|
| B60N 2/806 | (2018.01) |
| B60N 2/809 | (2018.01) |
| B60N 2/888 | (2018.01) |
| B60N 2/865 | (2018.01) |
| B60N 2/897 | (2018.01) |
| B60N 2/882 | (2018.01) |

(52) U.S. Cl.
CPC .......... B60N 2/865 (2018.02); B60N 2/882 (2018.02); B60N 2/897 (2018.02)

(58) Field of Classification Search
CPC ......... B60N 2/865; B60N 2/882; B60N 2/897
USPC ............................ 297/216.12, 391, 404, 410
See application file for complete search history.

(56) References Cited

U.S. PATENT DOCUMENTS

| 4,637,655 | A | * | 1/1987 | Fourrey | B60N 2/829 297/410 |
|---|---|---|---|---|---|
| 5,842,738 | A | * | 12/1998 | Knoll | B60R 21/207 297/216.12 |
| 5,882,071 | A | * | 3/1999 | Fohl | B60N 2/888 297/216.12 |
| 6,082,817 | A | * | 7/2000 | Muller | B60N 2/1842 297/216.12 |
| 6,217,118 | B1 | * | 4/2001 | Heilig | B60N 2/427 297/410 |
| 6,340,206 | B1 | * | 1/2002 | Andersson | B60N 2/23 297/216.14 |
| 6,474,733 | B1 | * | 11/2002 | Heilig | B60R 21/207 297/216.12 |
| 6,557,933 | B1 | | 5/2003 | Schambre et al. | |
| 6,572,186 | B1 | * | 6/2003 | Fischer | B60N 2/818 297/216.12 |
| 6,824,212 | B2 | * | 11/2004 | Malsch | B60N 2/4228 297/216.12 |
| 7,374,239 | B1 | * | 5/2008 | Jayasuriya | B60N 2/838 297/216.12 |
| 7,641,280 | B2 | * | 1/2010 | Uno | B60N 2/809 297/216.12 |

(Continued)

*Primary Examiner* — Rodney B White
(74) *Attorney, Agent, or Firm* — Vichit Chea; Price Heneveld LLP

(57) ABSTRACT

A headrest support assembly is provided that comprises a support member flexible between neutral and loaded states and having first and second ends with a channel extending therebetween. A cable is slidably received in the channel between first and second positions. The cable has first and second ends, and the cable moves from the first position to the second position when the support member moves from the neutral state to the loaded state.

19 Claims, 5 Drawing Sheets

(56) References Cited

U.S. PATENT DOCUMENTS

| | | | | |
|---|---|---|---|---|
| 7,673,938 B2* | 3/2010 | Yamaguchi | B60N 2/838 | 297/216.12 |
| 7,850,235 B2* | 12/2010 | Veine | B60N 2/865 | 297/216.12 |
| 7,871,129 B2* | 1/2011 | Boes | B60N 2/815 | 297/404 |
| 7,878,596 B2* | 2/2011 | Brunner | B60N 2/832 | 297/410 |
| 7,992,932 B2* | 8/2011 | Hartlaub | B60N 2/4228 | 297/216.12 |
| 8,042,428 B2* | 10/2011 | Shimizu | F16C 1/101 | 297/216.12 X |
| 8,047,606 B2* | 11/2011 | Matsui | F16C 1/101 | 297/216.12 |
| 8,113,576 B2* | 2/2012 | Otsuka | B60N 2/4228 | 297/216.12 |
| 8,113,577 B2* | 2/2012 | Nishiura | F16C 1/101 | 297/216.12 |
| 8,118,360 B2* | 2/2012 | Oota | B60N 2/818 | 297/216.12 |
| 8,201,881 B2* | 6/2012 | Otsuka | B60N 2/4228 | 297/216.12 |
| 8,307,734 B2* | 11/2012 | Shimizu | F16C 1/16 | 297/216.12 X |
| 8,348,338 B2* | 1/2013 | Galecka | B60N 2/809 | 297/216.12 |
| 8,397,349 B2* | 3/2013 | Nishiura | B60N 2/888 | 297/216.12 X |
| 8,459,731 B2 | 6/2013 | Runde | | |
| 8,899,685 B2* | 12/2014 | Haeske | B60N 2/809 | 297/410 |
| 9,446,693 B2* | 9/2016 | Morilhat | B60N 2/838 | |
| 9,475,415 B2 | 10/2016 | Grable | | |
| 9,789,794 B1* | 10/2017 | Roychoudhury | B60N 2/4228 | |
| 2001/0002764 A1* | 6/2001 | Fischer | B60N 2/20 | 297/410 |
| 2003/0042781 A1* | 3/2003 | Grammss | B60N 2/42727 | 297/407 |
| 2004/0075252 A1 | 4/2004 | Pan | | |
| 2004/0195872 A1* | 10/2004 | Svantesson | B60N 2/853 | 297/216.12 |
| 2007/0145803 A1* | 6/2007 | Kopetzky | B60N 2/829 | 297/410 |
| 2008/0272631 A1* | 11/2008 | Hartlaub | B60N 2/853 | 297/216.12 |
| 2008/0303262 A1* | 12/2008 | Sakakida | B60N 2/865 | 280/806 |
| 2008/0315636 A1* | 12/2008 | Yetukuri | B60N 2/4228 | 297/216.12 |
| 2009/0315370 A1* | 12/2009 | Hartlaub | F16C 1/101 | 297/216.12 |
| 2009/0322126 A1* | 12/2009 | Nishiura | B60N 2/888 | 297/216.12 |
| 2009/0322127 A1* | 12/2009 | Michalak | B60N 2/4228 | 297/216.12 |
| 2010/0001561 A1* | 1/2010 | Otsuka | B60N 2/42781 | 297/216.12 |
| 2010/0109397 A1* | 5/2010 | Bandurksi | B60N 2/4279 | 297/216.12 |
| 2011/0140486 A1* | 6/2011 | Schmitz | B60N 2/42781 | 297/216.12 |
| 2012/0080923 A1* | 4/2012 | Kunert | B60N 2/815 | 297/391 |
| 2013/0049430 A1* | 2/2013 | Sobieski | B60N 2/809 | 297/410 |
| 2014/0203616 A1* | 7/2014 | Humer | B60N 2/865 | 297/410 |
| 2014/0210243 A1* | 7/2014 | Humer | B60N 2/4864 | 297/391 |
| 2016/0250953 A1* | 9/2016 | Yoo | B60N 2/806 | 297/410 |

* cited by examiner

HEADREST SUPPORT ASSEMBLY

FIELD OF THE INVENTION

The present invention generally relates to a headrest, and more specifically to a headrest support assembly.

BACKGROUND OF THE INVENTION

Headrest support assemblies are common in vehicles. However, as currently designed, the headrest support assemblies require multiple anchors and pieces to adequately distribute loading of the headrest. Accordingly, a headrest support assembly is provided herein have a single-piece support received by the headrest bun and the seatback.

SUMMARY OF THE INVENTION

According to one aspect of the present invention, a headrest support assembly is provided that comprises a support member flexible between neutral and loaded states and having first and second ends with a channel extending therebetween. A cable is slidably received in the channel between first and second positions. The cable has first and second ends, and the cable moves from the first position to the second position when the support member moves from the neutral state to the loaded state.

Embodiments of the first aspect of the invention can include any one or a combination of the following features:
  each of the first and second ends of the cable includes an anchor extending past the respective first and second ends of the channel;
  each anchor abuts the respective first and second ends of the channel when the cable is in the second position;
  the support member comprises interior ribs defining a plurality of openings; and/or
  the cable is molded into the channel According to another aspect of the present invention, a headrest support assembly is provided that comprises a support member having first and second ends. A channel is defined by the support member and extends between the first and second ends. A cable is received in the channel and has first and second ends.

Embodiments of the first aspect of the invention can include any one or a combination of the following features:
  the cable is slidable between first and second positions;
  the cable is in the first position when the armature is in a neutral state and in the second position when the support member is in a loaded state;
  the support member defines retention clips positioned above each of the first and second ends;
  the support member comprises an upper portion, a transition curve, and a lower portion;
  the upper portion and the lower portion include first interior ribs positioned perpendicular to a rear side of the support member;
  the transition curve includes second interior ribs positioned parallel to the rear side of the support member;
  the support member is deflectable between a neutral state and a loaded state; and/or
  the upper portion is configured to move relative to the lower portion when the transition curve deflects as the support member deflects between the neutral state and the loaded state.

According to another aspect of the present invention, a headrest support assembly is provided that comprises a support member defining a channel extending between first and second ends of the support member. The headrest support assembly further comprises a cable having first and second ends with an interconnecting portion disposed therebetween. The interconnection portion is slidably received in the channel of the support member. The first and second ends of the cable are disposed outside of the channel when the cable is in a first position. First and second anchors are disposed on the first and second ends of the cable, respectively. The first and second anchors abut the first and second ends of the support member, respectively, when the cable is in a second position.

Embodiments of the first aspect of the invention can include any one or a combination of the following features:
  the cable is over-molded with the channel;
  first and second caps are operably coupled with the first and second ends of the support member;
  the support member is movable between first and second positions;
  the first and second anchors abut the first and second ends of the support member when the support member is in the second position; and/or
  the first and second anchors extend a predetermined distance beyond the first and second ends of the support member, and further wherein the predetermined distance is determined by the deflection of the support member in the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
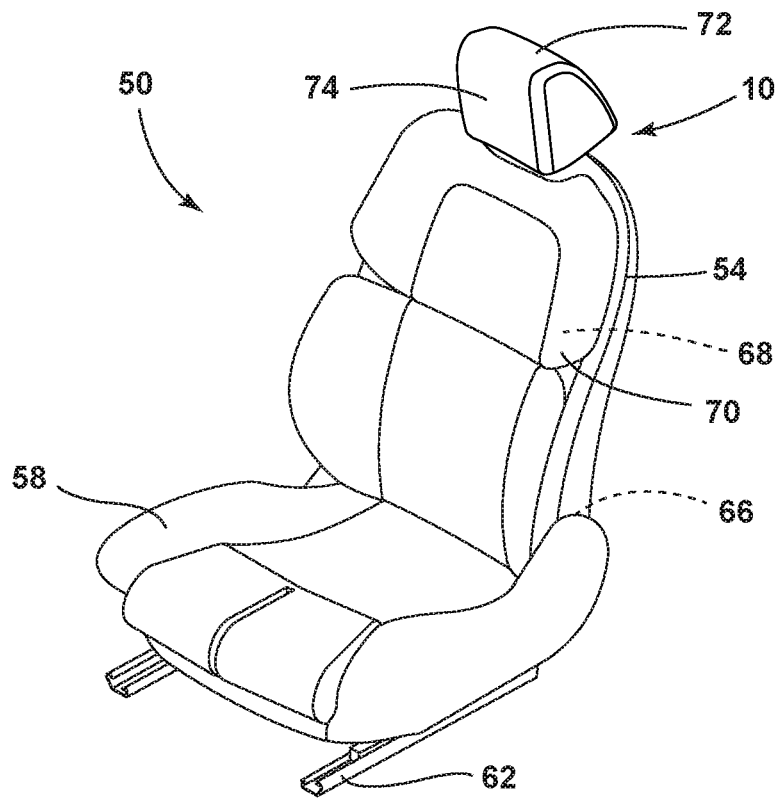
FIG. 1 is a side perspective view of a vehicle seating assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a headrest support assembly configured to be received by receiving wells positioned on a seatback of a vehicle seat. The headrest support assembly includes a support member configured to support a headrest bun and deflectable when a predetermined amount of force is applied to the headrest bun. When the support member deflects, a cable is pulled within a channel defined by the support member, causing anchors to contact the ends of the support member. The anchors and cable provide additional support to mitigate the effects of the force, particularly in a collision event.

Referring to FIGS. 1-6, reference numeral 10 generally denotes a headrest support assembly comprising a support member 14 flexible between neutral and loaded states and having first and second ends 18, 20 with a channel 24 extending therebetween. The headrest support assembly 10 further comprises a cable 28 slideably received in the channel 24 between first and second positions, wherein the cable 28 has first and second ends 32, 34. The cable 28 moves from the first position to the second position when the support member 14 moves from the neutral state to the loaded state. As used herein, cable 28 may refer to a solid member or a flexible braided member as known in the art.

Referring now to FIG. 1, a vehicle seat 50 of conventional construction is shown having a seatback 54 operably coupled to a seat base 58. The seat base 58 may be slideably coupled to a track assembly 62 configured to allow the seat 50 to slide fore and aft. The seatback 54 may be coupled to the seat base 58 by a pivotal connection 66 that includes a recline mechanism. The seatback 54 includes a seatback panel 64 (FIG. 2) and cushioning 68 disposed on the seatback panel 64 and covered with trim stock 70. The headrest support assembly 10 is operably coupled to the seatback 54, specifically the seatback panel 64, and supports a headrest bun 72. The headrest bun 72 includes a front face 74 and is positioned to support a user's head during occupancy and in a collision event. It is contemplated that the seat 50 may be used in any type of vehicle, such as a car, a truck, a van, etc. It is also contemplated that the concept set forth in this disclosure may be utilized in a front portion of a vehicle as well as a rear portion of the vehicle, depending on the configuration of the vehicle.

Figure 2:
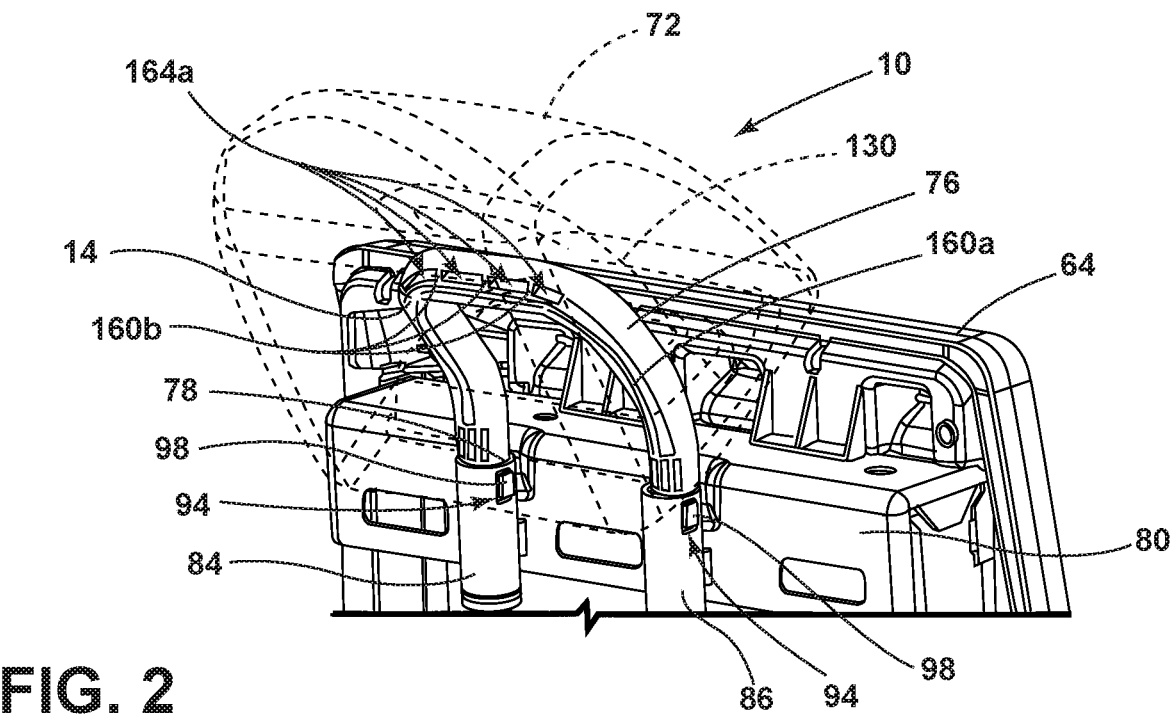
FIG. 2 is a front perspective view of a headrest support assembly operably coupled to a seatback.
Figure 3:
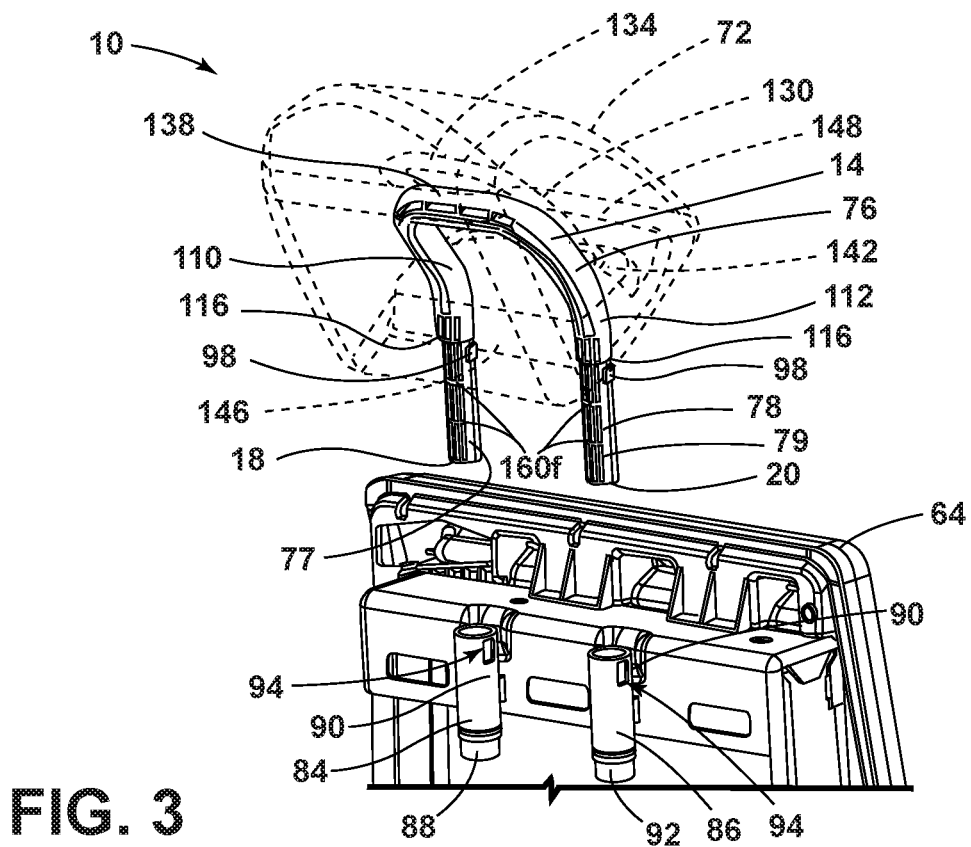
FIG. 3 is a front perspective exploded view of the headrest support assembly and the seatback of FIG. 2.

Referring now to FIGS. 2 and 3, in some examples, the headrest support assembly 10 is shown including the support member 14. The support member 14 includes an upper portion 76 and a lower portion 78. The lower portion 78 includes first and second legs 77, 79 configured to be received by the seatback panel 64. The seatback panel 64 includes at least one front surface 80. The front surface 80 includes first and second receiving wells 84, 86 positioned to protrude forwardly from the seatback panel 64. In the illustrated example, the receiving wells 84, 86 are generally cylindrical and configured for receiving the support member 14 having a circular cross-section. However, it is contemplated that the receiving wells 84, 86 may be of any shape and/or size to accommodate the cross-section of the support member 14. It is further contemplated that the receiving wells 84, 86 and/or the first and second ends 18, 20 of the lower portion 78 may include caps 88, 92. The caps 88, 92 may cover and protect the first and second ends 18, 20 of the support member 14.

Each of the first and second receiving wells 84, 86 has a circumferential wall 90 defining at least one retention space 94. Each retention space 94 is configured to receive a respective retention clip 98 extending outwardly from the lower portion 78 of the support member 14. In the illustrated example, each of the retention spaces 94 and the retention clips 98 is generally rectangular. However, it will be understood that any shape or style of retention clips 98 may be used. It will be further understood that the retention spaces 94 are shaped for receiving the retention clips 98 and may be adjusted to accommodate a different shape. The retention clips 98 are biased in an engaged position and are configured to extend outwardly of the retention spaces 94 when in the engaged position and mated with the retention spaces 94. The retention clips 98 may be released by exerting pressure inward on the retention clips 98, moving them from the engaged position to a released position and allowing the retention clips 98 to slide with the support member 14 along the receiving wells 84, 86.

The upper portion 76 and the lower portion 78 of the support member 14 are integrally formed and may be joined by first and second transition corners 110, 112. In some examples, the lower portion 78 may have a lesser diameter than the upper portion 76 and the transition corners 110, 112. The change in diameter creates an inverted lip 116 positioned below each of the transition corners 110, 112. This inverted lip 116 provides a stop mechanism for inserting the support member 14 into the receiving wells 84, 86. The inverted lip 116 prevents the support member 14 from being inserted into the receiving wells 84, 86 beyond a design position in the event that the retention clips 98 fail to engage with the retention spaces 94. The inverted lip 116 also provides an even transition from the outer surface of the receiving wells 84, 86 to the transition corners 110, 112 and the upper portion 76. The inverted lip 116 further provides a guide to ensure that the support member 14 is fully inserted into the receiving wells 84, 86.

The upper portion 76 of the support member 14 is received by a cavity 130 defined by the headrest bun 72. In some examples, the cavity 130 may generally be shaped as a triangular prism with an extended peak 134 receiving a top 138 of the upper portion 76. The top 138 of the upper portion 76 may generally be linear to provide a flat base for the headrest bun 72 to pivot on. The headrest bun 72 may pivot fore and aft on the top 138 of the upper portion 76 as permitted by the overall shape of the cavity 130. The cavity 130 may further have a base opening 142 defined by first and second edges 146, 148 of the headrest bun 72. The base opening 142 may generally be rectangular, and the first and second edges 146, 148 may abut the upper portion 76 and/or the transition corners 110, 112 as the headrest bun pivots 72 on the top 138 of the upper portion 76. It is also contemplated that the cavity 130 may have various other prismatic shapes including, for example, frustoconical, trapezoidal, etc. As the shape of the cavity 130 may vary, it will be understood that the shape of the base opening 142 may also be adjusted to match the shape of the cavity 130 without departing from the scope of the present disclosure.

Figure 4:
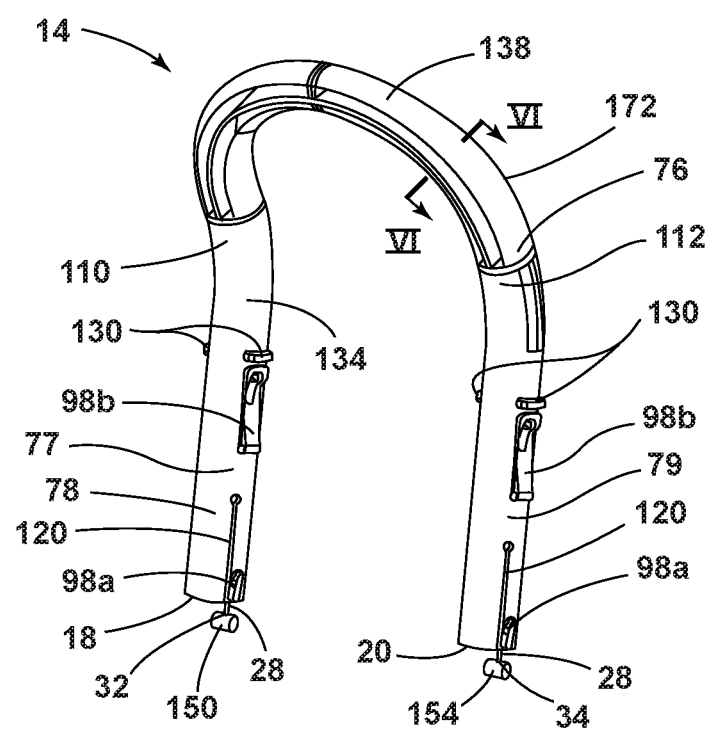
FIG. 4 is a front perspective view of a support member for a headrest having a cable.
Figure 5:
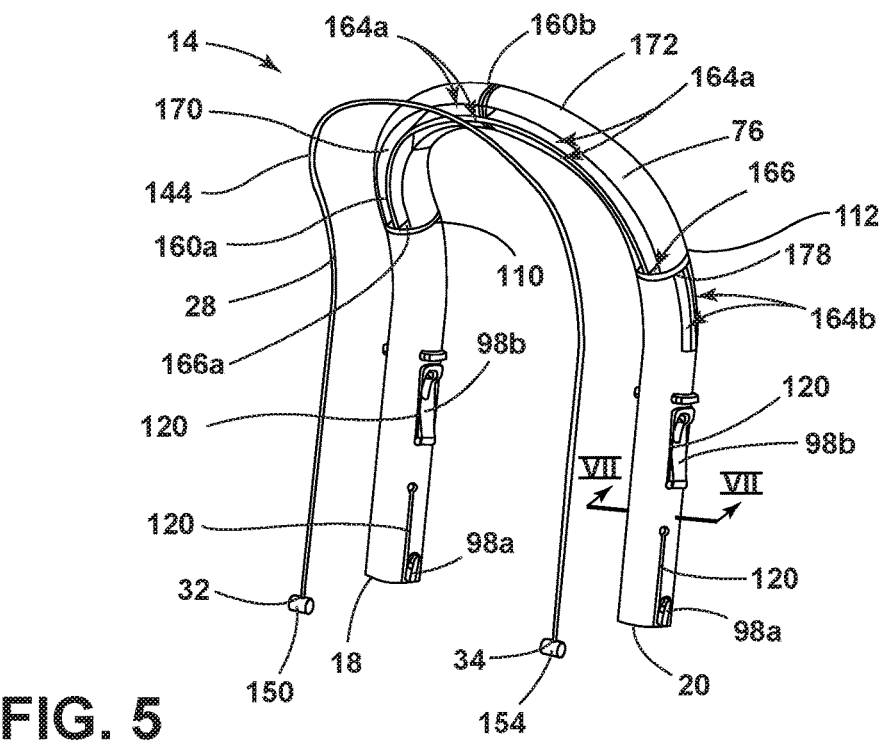
FIG. 5 is a front perspective view of the support member including the cable exploded away from the support member of FIG. 4.

Referring now to FIGS. 4 and 5, in other examples, the support member 14 includes the upper portion 76 and the lower portion 78 joined by the first and second transition corners 110, 112. The upper portion 76 is generally non-linear with the top 138 having a curved surface, and the position of the first and second transition corners 110, 112 direct the upper portion 76 to extend upward from the lower portion at a predetermined angle. As discussed elsewhere herein and shown in FIGS. 2 and 3, the upper portion 76 may be received by the cavity 130 defined by the headrest bun 72 and may be deflectable as the headrest bun 72 is loaded.

Figure 6:
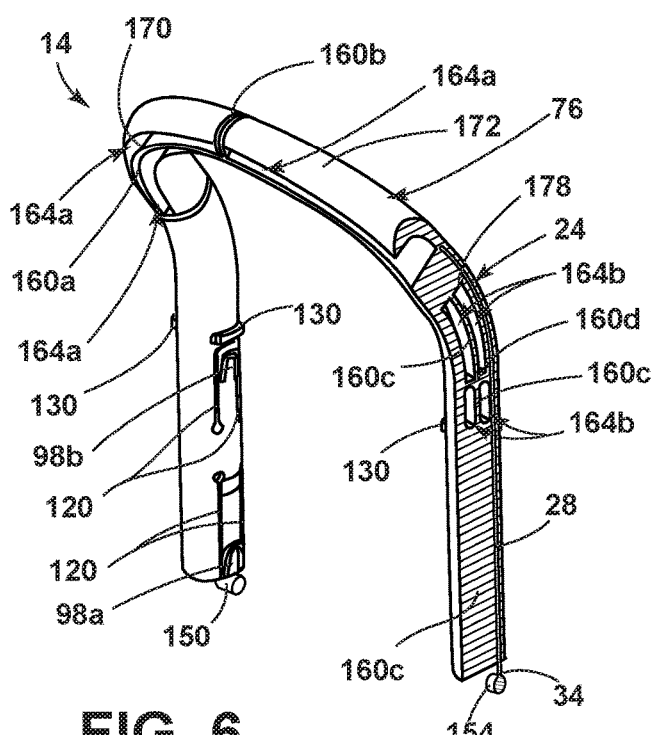
FIG. 6 is a partial cross-sectional view of the support member of FIG. 4 taken along line VI-VI.

Referring still to FIGS. 4 and 5, the lower portion 78 of the support member 14 is integrally formed with the upper portion 76 and includes the first end 18 and the second end 20. The first and second ends 18, 20 have a generally circular cross-section configured to be received by the receiving wells 84, 86 of the seatback panel 64, as discussed elsewhere herein and shown in FIG. 2. Proximate each of the first and second ends 18, 20 are lower retention clips 98a. The lower retention clips 98a are biased outwardly towards an engaged position and deflect inwardly when pressure is applied. When the lower retention clips 98a are inwardly deflected, the first and second ends 18, 20 may be received by the received wells 84, 86, as shown in FIG. 2. Upper retention clips 98b are positioned further away from the first and second ends 18, 20. Like the lower retention clips 98a, the upper retention clips 98b are biased outwardly towards an engaged position and deflect inwardly when pressure is applied. In some examples, the upper retention clips 98b may be U-type fasteners. In other examples, the upper retention clips 98b may be the same biased clips as the lower retention clips 98a. In still other examples, both the lower retention clips 98a and the upper retention clips 98b may be U-type fasteners, as shown in FIG. 6, or any other fastener configured to connect tubular pieces. Slots 120 are positioned proximate the lower and upper clips 98a, 98b to allow the deflection of each of the lower and upper clips 98a, 98b. Together, the lower retention clips 98a and the upper retention clips 98b secure the support member 14 to the receiving wells 84, 86, as shown in FIG. 2.

Referring still to FIGS. 4 and 5, in some examples, stops 130 are positioned between the upper clips 98b and the transition corners 110, 112. The stops 130 extend laterally from opposing sides of each of the first legs and the second legs 77, 79. The stops 130 extend away from the outer surface of the support member 14 and are positioned to abut the receiving wells 84, 86 when the support member 14 is engaged with the seatback panel 64. The stops 130 abut the receiving wells 84, 86 to prevent the support member 14 from being over-inserted into the receiving wells 84, 86 if the lower and upper retention clips 98a, 98b are not fully received by the receiving wells 84, 86 to hold the support member in place. The stops 130 further provide a guide for whether or not the support member 14 has been fully inserted into the receiving wells 84, 86. It will be understood that the stops 130 are interchangeable with the inverted lip 116, as described elsewhere herein, and provide a similar function.

Referring now to FIGS. 2-7, the support member 14 may be formed from a polymeric material, for example, polypropylene, acrylonitrile butadiene styrene, Nylon, polyoxymethylene, etc. The support member 14 is molded from the polymeric material to include a plurality of ribs 160 and the channel 24. The channel 24 is configured to house the cable 28, and the cable 28 is overmolded into the channel 24. The cable 28 is formed from an alloy, for example, steel, and provides additional support in the event of a loading event.

Referring now to FIGS. 5 and 6, the cable 28 is operably coupled with the support member 14 as received in the channel 24 thereof. The cable 28 includes first and second ends 32, 34 and an interconnecting portion 144 extending between the first and second ends 32, 34. The interconnecting portion 144 is of a predetermined length to allow the first and second ends 32, 34 to extend beyond the first and second ends 18, 20 of the support member 14. The cable 28 is overmolded into the channel 24 to eliminate gaps between the channel 24 and the cable 28 and provide a secure fit. The overmolding may eliminate the need for fasteners to hold the cable 28 within the channel 24 and may provide a bond between the channel 24 and the cable 28 in some examples.

The first and second ends 32, 34 of the cable 28 are operably coupled to first and second anchors 150, 154, respectively, and are positioned a predetermined distance past the first and second ends 18, 20 of the support member 14. The predetermined distance is chosen by the size, shape, and expected deflection of the support member 14, as discussed elsewhere herein. In some examples, the first and second anchors 150, 154 may be cylindrical in shape where the lateral surface areas of the first and second anchors 150, 154 are operably coupled to the first and second ends 32, 34 of the cable 28. However, it will be understood that the anchors 150, 154 may be of any shape including a square prism, a rectangular prism, a sphere, a triangular prism, etc. The first and second anchors 150, 154 may be formed of the same alloy as the cable 28, for example, steel.

Referring now to FIG. 6, the upper portion 76 of the support member 14 includes ribs 160a-160d configured to define a plurality of spaces 164a, 164b. As shown in FIG. 5, in some examples, a first upper rib 160a extends from a first face 166a of the first transition corner 110 to a first face 166 of the second transition corner 112. The first upper rib 160a is positioned perpendicularly to a rear surface 172 of the support member 14. The positioning of the first upper rib 160a perpendicular to the rear surface 172 provides increased stability to prevent undesired deflection of the upper portion 76 supported by the first upper rib 160a when the support member 14 undergoes a loading event. An open end 170 may be positioned opposite the rear surface 172. In some examples, a second upper rib 160b extends through the upper portion 76 perpendicular to the first upper rib 160a, defining upper spaces 164a. In other examples, a plurality of second upper ribs 160b may be used, increasing the number of upper spaces 164a (FIG. 2).

Referring now to FIGS. 5 and 6, each of the transition corners 110, 112 includes a first transition rib 160c extending parallel to the rear surface 172. Each of the first transition ribs 160c extends from a second face 178 of one of the first transition corner 110 and the second transition corner 112. The first transition ribs 160c extend towards the lower portion 78 until the first transition ribs 160c are proximate the stops 130. A second transition rib 160d is positioned perpendicular to and across each of the first transition ribs 160c for added support. The first and second transition ribs 160c, 160d define a plurality of transition spaces 164b. In some examples, the transition spaces 164b may be fully enclosed. In other examples, the transition spaces 164b may be partially enclosed. In still other examples, some of the plurality of transition spaces 164b may be partially enclosed while others of the plurality of transition spaces 164b are fully enclosed. The parallel positioning of the first transition rib 160c to the rear surface 172 provides a focused point of deflection at the transition corners 110, 112, thereby allowing the transition corners 110, 112 to deflect a predetermined amount in a loading event. Flexibility is increased at the location of the transition ribs 160c due to the perpendicular positioning of the ribs 160c to a load force, along with the relief provided by the transition spaces 164b.

Figure 7:
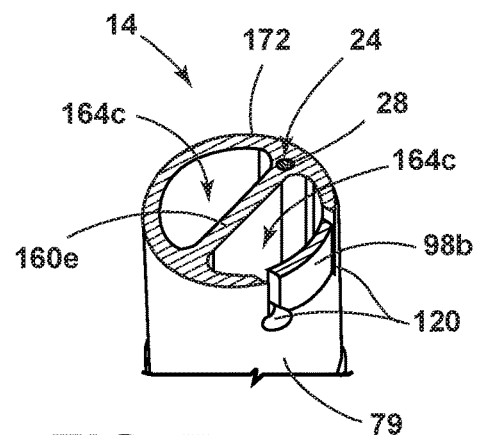
FIG. 7 is a cross-sectional view of the support member of FIG. 5 taken along line VII-VII.
Figure 8A:
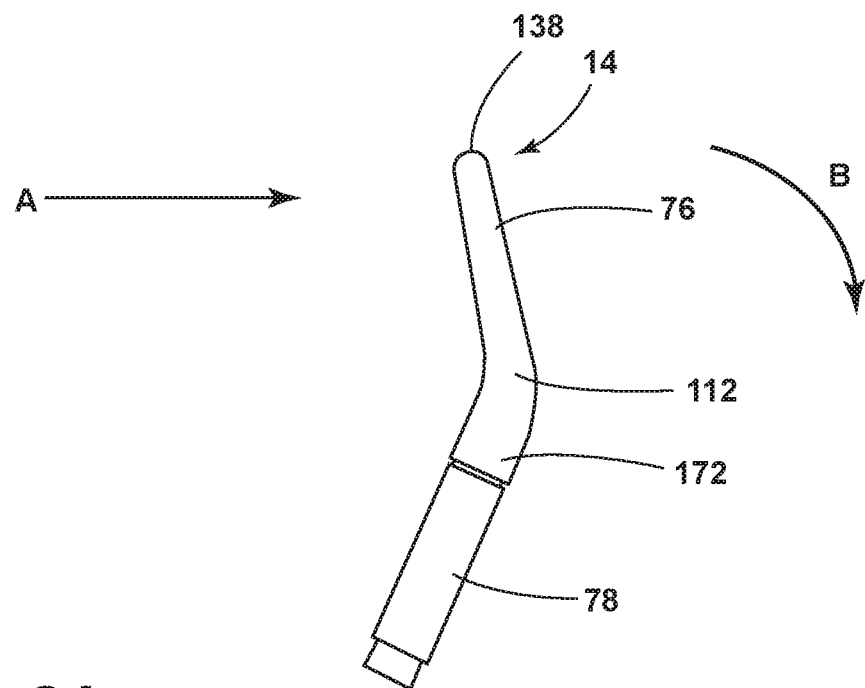
FIG. 8A is a first side profile view of a support member for a headrest in a neutral state and having a cable.
Figure 8B:
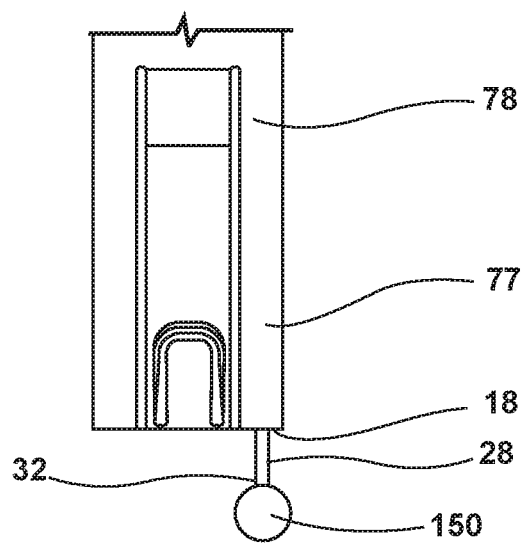
FIG. 8B is a second side profile view of the support member and cable of FIG. 8A, where the cable is in a first position.

Referring now to FIGS. 6 and 7, each of the first and second legs 77, 79 of the lower portion 78 include a lower rib 160e. Each lower rib 160e is positioned perpendicular to the rear surface 172 and aligned with the first upper rib 160a. The lower ribs 160e extend from the stops 130 through the lengths of the first and second legs 77, 79 of the lower portion, forming a pair of lower spaces 164c. Each lower rib 160e is further aligned with the channel 24 and provides additional support to one of the first and second legs 77, 79 during a loading event. In some examples, additional lower ribs 160f may be added to provide further support as shown in the configuration of FIG. 3. As a whole, the ribs 160a-160d and the spaces 164a, 164b provide structural support for the support member 14 at various locations along the support member 14 and allow calculated deflection at other locations along the support member 14 in a loading event.

Referring now to FIGS. 8A-9B, in a loading event, a load is applied along the path indicated by arrow A to the upper portion 76 of the support member 14. The load generally occurs from an occupant's head applying force on the headrest bun 72 that is translated to the loading along arrow A. The load causes the upper portion 76 to deflect rearwardly along the deflection path indicated by arrow B, pushing the upper portion 76 rearward relative to the transition corners 110, 112. In some examples, the upper portion 76 may deflect at the top 138 of the support member 14.

Figure 9A:
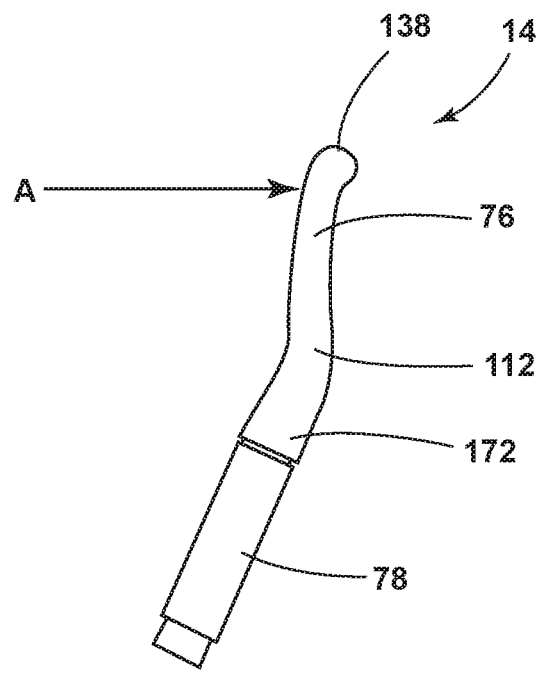
FIG. 9A is a first side profile view of a support member for a headrest in a loaded state and having a cable.
Figure 9B:
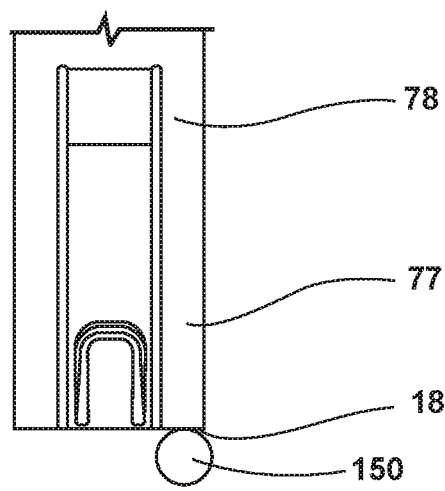
FIG. 9B is a second side profile view of the support member and cable of FIG. 9A, where the cable is in a second position.

When the upper portion 76 is pushed rearward, the cable 28 is pulled along the channel 24. The deflection of the upper portion 76 of the support member 14 as a whole from a neutral state (FIG. 8A) to a loaded state (FIG. 9A) causes the cable ends 32, 34 to move from a first position (FIG. 8B) to a second position (FIG. 9B). When the cable ends 32, 34 are in the first position, the anchors 150, 154 are in a first position below the ends 18, 20 of the support member 14. When the cable ends 32, 34 slide from the first position to the second position, the anchors 150, 154 similarly slide from the first position to a second position. In the second position (FIG. 9B), the anchors 150, 154 are abutting the first and second ends 18, 20 of the support member 14. This provides additional support against the loading by bracing the support member 14, particularly bracing the upper portion 76 from further deflection.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A headrest support assembly, comprising:
   a support member having first and second ends with a channel extending therebetween, wherein the support member includes an upper portion that is flexible to deflect from a neutral state to a loaded state when a load is applied to the upper portion of the support member; and
   a cable slidably received in the channel between first and second positions, wherein the cable has first and second ends, and further wherein the cable moves from the first position to the second position when the upper portion of the support member moves from the neutral state to the loaded state.

2. The headrest support assembly of claim 1, wherein each of the first and second ends of the cable includes an anchor extending past the respective first and second ends of the support member.

3. The headrest support assembly of claim 2, wherein each anchor abuts the respective first and second ends of the support member when the cable is in the second position.

4. The headrest support assembly of claim 1, wherein the support member comprises interior ribs defining a plurality of openings.

5. The headrest support assembly of claim 1, wherein the cable is over molded into the channel.

6. A headrest support assembly, comprising:
   a support member having first and second ends, an upper portion, a lower portion, and a transition curve;
   a channel defined by the support member and extending between the first and second ends of the support member; and
   a cable received in the channel and having first and second cable ends.

7. The headrest support assembly of claim 6, wherein the cable is slidable within the channel between first and second positions.

8. The headrest support assembly of claim 7, wherein the cable is in the first position when the support member is in a neutral state, and further wherein the cable is in the second position when the support member is in a loaded state.

9. The headrest support assembly of claim 6, wherein the support member includes retention clips positioned above each of the first and second ends of the support member.

10. The headrest support assembly of claim 6, wherein the upper portion and the lower portion include first interior ribs positioned perpendicular to a rear side of the support member.

11. The headrest support assembly of claim 10, wherein the transition curve includes second interior ribs positioned parallel to the rear side of the support member.

12. The headrest support assembly of claim 6, wherein the support member is deflectable between a neutral state and a loaded state.

13. The headrest support assembly of claim 12, wherein the upper portion is configured to move relative to the lower portion as the support member deflects through the transition curve and between the neutral state and the loaded state.

14. A headrest support assembly, comprising:
   a support member defining a channel extending between first and second ends of the support member;
   a cable having first and second ends with an interconnecting portion disposed therebetween, wherein the interconnecting portion is slidably received in the channel of the support member, and further wherein the first and second ends are disposed outside of the channel of the support member when the cable is in a first position; and
   first and second anchors disposed on the first and second ends of the cable, respectively, wherein the first and second anchors abut the first and second ends of the support member, respectively, when the cable is in a second position.

15. The headrest support assembly of claim 14, wherein the cable is over-molded with the channel.

16. The headrest support assembly of claim 14, wherein first and second caps are operably coupled with the first and second ends of the support member.

17. The headrest support assembly of claim 14, wherein the support member is movable between first and second positions.

18. The headrest support assembly of claim 17, wherein the cable is moved to the second position when the support member is in the second position.

19. The headrest support assembly of claim 17, wherein the first and second anchors extend a predetermined distance beyond the first and second ends of the support member, and further wherein the predetermined distance is determined by an expected deflection of the support member in the second position.

* * * * *